United States Patent
Matthews et al.

(10) Patent No.: US 10,054,043 B2
(45) Date of Patent: Aug. 21, 2018

(54) SYSTEMS AND METHODS FOR ESTIMATING A TIME OF AN ENGINE EVENT

(71) Applicant: GENERAL ELECTRIC COMPANY, Schenectady, NY (US)

(72) Inventors: Brett Alexander Matthews, Albany, NY (US); Jeffrey Jacob Bizub, Milwaukee, WI (US); Iyad Batal, San Ramon, CA (US); Frederick Wilson Wheeler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 14/680,863

(22) Filed: Apr. 7, 2015

(65) Prior Publication Data
US 2016/0298537 A1     Oct. 13, 2016

(51) Int. Cl.
F02B 77/00     (2006.01)
F02B 77/08     (2006.01)
(Continued)

(52) U.S. Cl.
CPC ........ F02B 77/085 (2013.01); F01L 1/34403 (2013.01); F02D 35/027 (2013.01);
(Continued)

(58) Field of Classification Search
CPC .................... F02B 77/085; F01L 1/34403
See application file for complete search history.

(56) References Cited

U.S. PATENT DOCUMENTS 5,230,315 A    7/1993  Kanesaka
6,536,389 B1   3/2003  Shelby et al.
(Continued)

FOREIGN PATENT DOCUMENTS

DE    10305656 A1    1/2004
EP    0706610 A1     4/1996
GB    2413850 A      11/2005

OTHER PUBLICATIONS

Horner, Thomas G., Engine Knock Detection Using Spectral Analysis Techniques with a TMS320 DSP, Texas Instruments, Application Report, Aug. 1995, pp. 1-62, http://www.ti.com/lit/an/spra039/spra039.pdf.
(Continued)

*Primary Examiner* — Hieu T Vo
*Assistant Examiner* — Sherman Manley
(74) *Attorney, Agent, or Firm* — GE Global Patent Operation; John P. Darling (57) ABSTRACT

Systems and methods for estimating when an engine event occurs is described. The system includes a controller configured to receive a first signal from at least one knock sensor coupled to a combustion engine, receive a second signal from at least one engine crankshaft sensor coupled to the combustion engine, transform the first and second signals into a plurality of feature vectors using a multivariate transformation algorithm, determine an expected window of an engine event with a statistical model, center a segment of the plurality of feature vectors around the expected window, estimate, using the statistical algorithm, a time in the expected window corresponding to when the engine event occurred, and adjust operation of the combustion engine based on the time.

20 Claims, 8 Drawing Sheets

(51) Int. Cl.

| | | |
|---|---|---|
| *F02D 41/22* | (2006.01) | |
| *F02D 35/02* | (2006.01) | |
| *G01L 23/22* | (2006.01) | |
| *G01M 15/12* | (2006.01) | |
| *F02D 41/24* | (2006.01) | |
| *F01L 1/344* | (2006.01) | |
| *F02D 41/28* | (2006.01) | |

(52) U.S. Cl.
CPC ....... *F02D 41/221* (2013.01); *F02D 41/2464* (2013.01); *G01L 23/221* (2013.01); *G01M 15/12* (2013.01); *F02D 2041/288* (2013.01); *F02D 2200/025* (2013.01); *Y02T 10/40* (2013.01)

(56) References Cited

U.S. PATENT DOCUMENTS

| 6,769,404 | B2* | 8/2004 | Aoyama | F01L 13/0021 123/406.29 |
|---|---|---|---|---|
| 7,089,895 | B2* | 8/2006 | Naber | F01L 9/04 123/90.11 |
| 2003/0230281 | A1* | 12/2003 | Hoshino | G01L 23/225 123/406.29 |
| 2004/0139949 | A1* | 7/2004 | Koseki | F01L 1/20 123/568.14 |
| 2008/0229806 | A1 | 9/2008 | Cubr et al. | |
| 2009/0048729 | A1* | 2/2009 | Waters | G01M 15/042 701/31.4 |
| 2009/0222194 | A1* | 9/2009 | Bowman | F02D 13/0269 701/103 |
| 2010/0049420 | A1* | 2/2010 | Smith | F02D 13/0238 701/103 |
| 2016/0195029 | A1* | 7/2016 | Bizub | F02D 35/027 73/35.03 |
| 2016/0201611 | A1* | 7/2016 | Bizub | F02M 25/0753 123/568.11 |
| 2016/0223422 | A1* | 8/2016 | Bizub | F02B 77/085 73/35.01 |

OTHER PUBLICATIONS

Jargenstedt, Mats, Detecting Start of Combustion using Knock Sensor Signals, Sep. 25, 2000, pp. 1-47, http://www.fs.isy.liu.se/Publications/MSc/00_EX_3035_MJ.pdf.

Hirako et al., "Influence of Valve Noise on Knock Detection in Spark Ignition Engines", SAE Technical Paper, pp. 1-13, Feb. 1, 1988.

Badawi et al., "Identification of Diesel Engine Cycle Events using Measured Surface Vibration", Small Engine Technology Conference and Exhibition San Antonio,pp. 1-12, Nov. 13, 2006.

Scheuerell et al., "Valve Event Detection Using Knock Sensor Signals", SAE Technical Paper, pp. 1-10, Apr. 16, 2007.

Jin et al., "Comparison of Different Techniques for Time-Frequency Analysis of Internal Combustion Engine Vibration Signals", Journal of Zhejiang University Science A, vol. No. 12,Issue No. 7, pp. 519-531, Jul. 1, 2011.

European Search Report and Opinion issued in connection with corresponding EP Application No. 16163698.0 dated Aug. 31, 2016.

* cited by examiner

| CFR RON (subset) | # Cycles | mean Δt (°) | STDEV Dt (°) | # Misses |
|---|---|---|---|---|
| CFR.0001-0012 | 120 | -0.100 | 0.505 | 0 |
| CFR.0013-0024 | 120 | -0.108 | 0.469 | 0 |
| CFR.0025-0036 | 120 | -0.070 | 0.390 | 0 |
| CFR.0037-0048 | 120 | -0.069 | 0.395 | 0 |
| CFR.0049-0060 | 120 | -0.050 | 0.453 | 0 |

FIG. 9

SYSTEMS AND METHODS FOR ESTIMATING A TIME OF AN ENGINE EVENT

BACKGROUND

The subject matter disclosed herein relates to systems and methods for estimating timing of an engine event in a combustion engine.

Combustion engines typically combust a carbonaceous fuel, such as natural gas, gasoline, diesel, and the like, and use the corresponding expansion of high temperature and pressure gases to apply a force to certain components of the engine (e.g., piston disposed in a cylinder) to move the components over a distance. Each cylinder may include one or more valves that open and close in conjunction with combustion of the carbonaceous fuel. For example, an intake valve may direct an oxidant such as air into the cylinder. A fuel mixes with the oxidant and combusts (e.g., ignition via a spark) to generate combustion fluids (e.g., hot gases), which then exit the cylinder via an exhaust valve.

Some engine events (e.g., improper opening and closing of intake and/or exhaust valves, or mechanical failures) may be detrimental to engine performance. Unfortunately, it may be difficult to monitor when and/or if such events occur.

BRIEF DESCRIPTION

A summary of certain embodiments disclosed herein is set forth below. It should be understood that these aspects are presented merely to provide the reader with a brief summary of these embodiments and that these aspects are not intended to limit the scope of this disclosure. Indeed, this disclosure may encompass a variety of aspects that may not be set forth below.

In one embodiment, a system for estimating when an engine event occurs includes a controller. The controller is configured to receive a first signal from at least one knock sensor coupled to a combustion engine, receive a second signal from at least one engine crankshaft sensor coupled to the combustion engine, transform the first and second signals into a plurality of feature vectors using a multivariate transformation algorithm, determine an expected window of an engine event with a statistical algorithm, center a segment of the plurality of feature vectors around the expected window, estimate, using the statistical algorithm, a time in the expected window corresponding to when the engine event occurred, and adjust operation of the combustion engine based on the time.

In another embodiment, a method for training a controller to estimate the timing of an engine event includes receiving a signal from at least one knock sensor, where the signal has data corresponding to an engine event. The method also includes transforming the signal into a plurality of feature vectors using a multivariate transformation algorithm and sorting the plurality of feature vectors into a first state and a second state. The first state corresponds to a time before the engine event and the second state corresponds to a time after the engine event. The method further includes forming a first statistical model using the first state and forming a second statistical model using the second state. Finally, the method combines the first statistical model and the second statistical model into a third statistical model, where the third statistical model is configured to predict when the engine event occurs during normal engine operation.

In another embodiment, a method for estimating a time of an engine event includes receiving a first signal from at least one knock sensor coupled to a combustion engine and receiving a second signal from at least one engine crankshaft sensor. The method also includes transforming the first and second signals into a plurality of feature vectors and determining an expected window of an engine event with a statistical algorithm. The method also centers a segment of the plurality of feature vectors around the expected window of an engine event and estimates a time of the engine event using the statistical algorithm. Finally, the method outputs a control action for at least the combustion engine based on the time of the engine event.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The presently disclosed systems and methods relate to detecting sudden onset events in a reciprocating, internal combustion engine using one or more sensors, such as a knock sensor. A knock sensor may include an acoustic or sound sensor, a vibration sensor, or any combination thereof. For example, the knock sensor may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. The knock sensor may monitor acoustics and/or vibrations associated with combustion in the engine to detect a knock condition (e.g., combustion at an unexpected time not during a normal window of time for combustion), or other engine condition that may create an acoustic and/or vibration change in an engine cylinder (e.g., valve closure or loose counter weight in the engine). In other embodiments, the sensor may not be a knock sensor, but any sensor that may sense vibration, pressure, acceleration, deflection, or movement.

In certain instances, it may be desirable to detect various engine events (e.g., exhaust and/or intake valve 62 closures) that occur during normal engine operation, as well as events that may forecast a potential engine malfunction or engine failure. Detecting such events may not only help prevent a prospective engine failure, but may also provide information related to the efficiency of the engine. Therefore, a user or controller may adjust various parameters based on the detected operating condition information to optimize engine performance.

Because of the percussive nature of combustion engines, knock sensors may be capable of detecting vibration, percussion, and/or acoustic signatures when mounted on the exterior of an engine cylinder. However, the knock sensors may also be disposed at various locations in or about one or more cylinders. Knock sensors detect, e.g., vibrations of the cylinder, and a controller may convert a one-dimensional profile (e.g., sound or vibration) of the cylinder, provided by a knock sensor, into useful parameters for determining combustion conditions in the cylinder. For example, the knock sensor detects vibrations in, or proximate to, the cylinder, and communicates a signal indicative of the vibrational profile to the controller. Knock sensor signals may be one-dimensional vibrational profiles; furthermore, the frequency content of knock sensor signals may characterize many types of disruptions in the cylinder.

It may be desirable to analyze and model a knock sensor signal indicative of a normal engine operating event (e.g., intake valve 62 closures) or a detrimental engine event (e.g., loose counterweight in the engine) so that such an event may be predicted by a controller or other computer. Statistical models may associate a percussive or vibration frequency in the signal with the particular engine event. Moreover, a statistical model may be able to characterize various frequency ranges as precursors of such events. Therefore, the statistical model may be able to predict when the event is about to occur so that the engine can take corrective action (e.g., shutdown).

Figure 1:
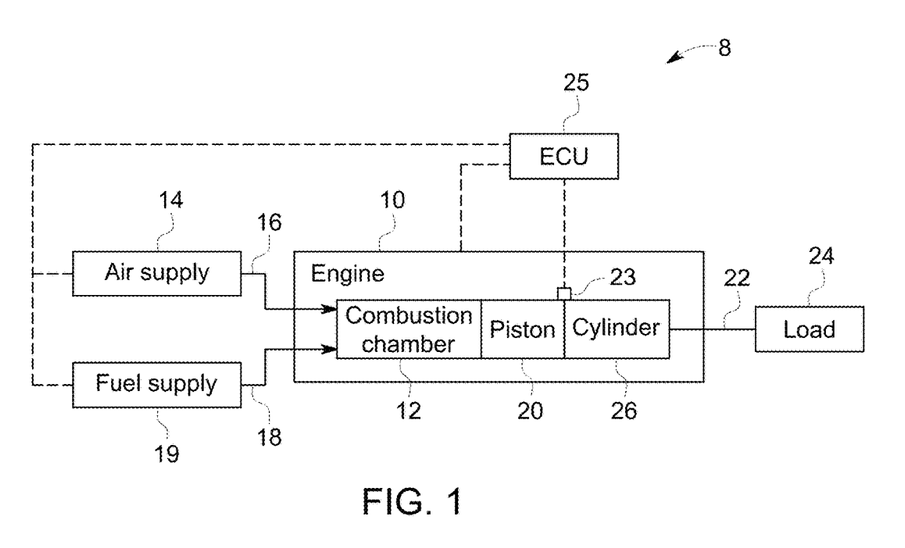
FIG. 1 illustrates a block diagram of a portion of an engine driven power generation system having a reciprocating internal combustion engine, in accordance with aspects of the present disclosure.

Turning to the drawings, FIG. 1 illustrates a block diagram of an embodiment of a portion of an engine driven power generation system having a reciprocating internal combustion engine. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An oxidant supply 14 (e.g., an air supply) is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example. The fuel 18 may also include a variety of liquid fuels, such as gasoline or diesel fuel.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders 26 (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders 26 and/or the pistons 20 may have a diameter of between approximately 10-40 cm, 15-25 cm, or about 15 cm. The system 8 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may sense vibrations, acoustics, or sound caused by combustion in the engine 10, such as vibrations, acoustics, or sound due to detonation, pre-ignition, and/or pinging. Vibrations, acoustics, or sound may also be caused by sudden onset events such as closure of an intake or exhaust valve or mechanical failures (e.g., loose pistons, broken valves, loose connecting rod bolts, or the like) of the engine 10. Therefore, the knock sensor 23 may include an acoustic or sound sensor, a vibration sensor, or a combination thereof. For example, the knock sensor 23 may include a piezoelectric vibration sensor. The knock sensor 23 may monitor acoustics and/or vibration associated with combustion in the engine 10 to detect a knock condition, e.g., combustion at an unexpected time not during a normal window of time for combustion. The knock sensor 23 is shown communicatively coupled to a control system or controller 25, such as an engine control unit (ECU) 25. During operations, signals from the knock sensor 23 are communicated to the ECU 25. The ECU 25 may then manipulate the signals that the ECU 25 receives and adjust certain engine 10 parameters accordingly. For example, the ECU 25 may adjust ignition timing and/or a fuel/oxidant ratio to enhance engine performance.

Figure 2:
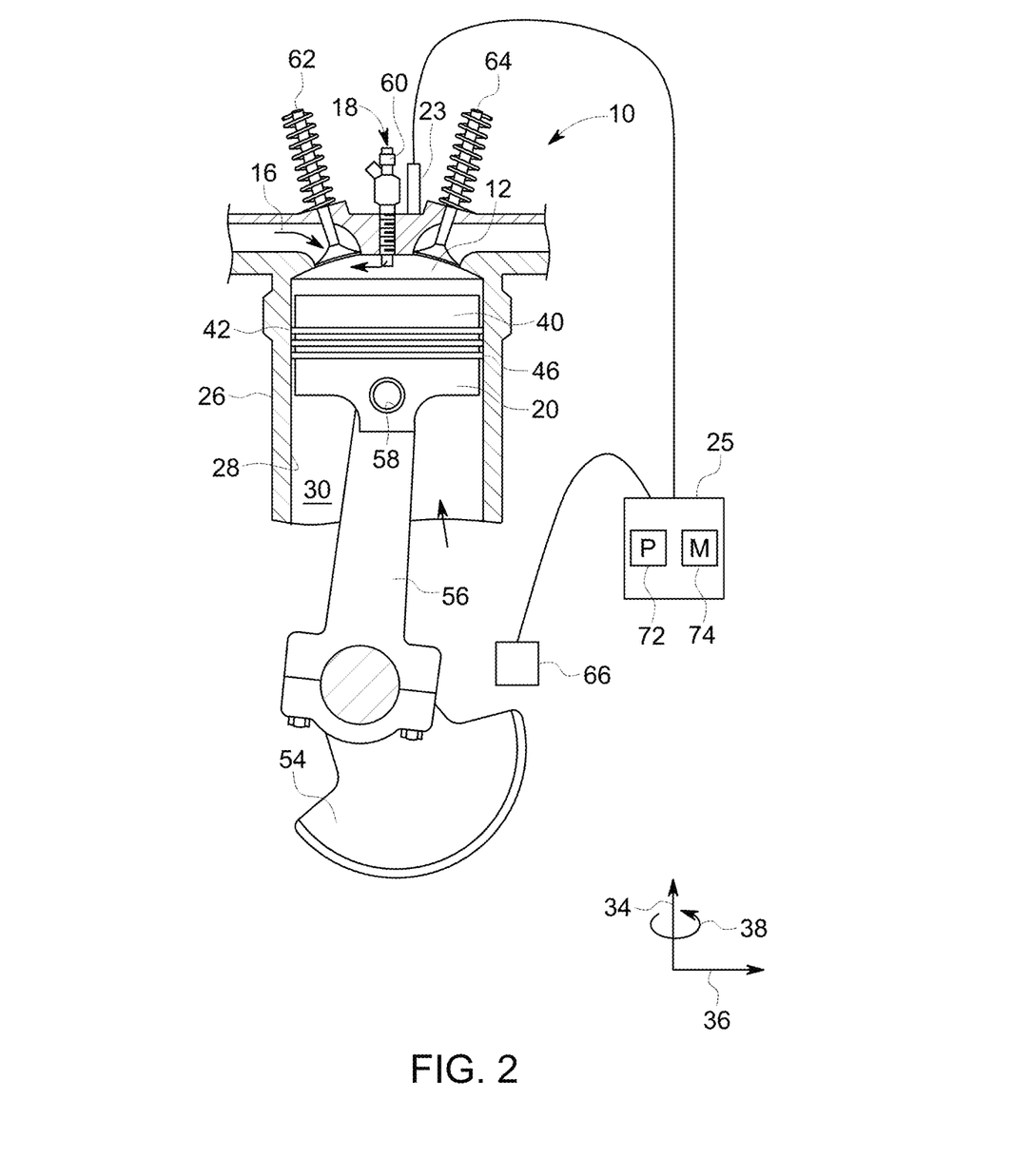
FIG. 2 illustrates a cross-sectional side view of a piston-cylinder assembly having a piston disposed within a cylinder of the reciprocating engine of FIG. 1, in accordance with aspects of the present disclosure.

FIG. 2 is a cross-sectional side view of an embodiment of a piston-cylinder assembly having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of oxidant (e.g., air 16) to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the oxidant 16 in the combustion chamber 12 may cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from TDC to BDC or from BDC to TDC, the crankshaft 54 rotates one half of a revolution. Each movement of the piston 20 from TDC to BDC or from BDC to TDC is called a stroke, and engine 10 embodiments may include two-stroke engines, three-stroke engines, four-stroke engines, five-stroke engines, six-stroke engines, or more.

During engine 10 operations, a sequence including an intake process, a compression process, a power process, and an exhaust process typically occurs. The intake process enables a combustible mixture, such as fuel 18 and oxidant 16 (e.g., air), to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC, while keeping the exhaust valve 64 open. The exhaust process thus expels the spent fuel-air mixture through the exhaust valve 64. It is to be noted that more than one intake valve 62 and exhaust valve 64 may be used per cylinder 26

The depicted engine 10 may include a crankshaft sensor 66, the knock sensor 23, and the engine control unit (ECU) 25, which includes a processor 72 and memory unit 74. The crankshaft sensor 66 senses the position and/or rotational speed of the crankshaft 54. Accordingly, a crank angle or crank timing information may be derived from the crankshaft sensor 66. That is, when monitoring combustion engines, timing is frequently expressed in terms of crankshaft angle. For example, a full cycle of a four stroke engine 10 may be measured as a 720° cycle. The knock sensor 23 may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. In other embodiments, the sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder may include one or more knock sensors 23. The crankshaft sensor 66 and the knock sensor 23 are shown in electronic communication with the ECU (e.g., a controller) 25. The ECU 25 includes non-transitory code or instructions stored in a machine-readable medium (e.g., the memory unit 74) and used by a processor (e.g., the processor 72) to implement the techniques disclosed herein. The memory may store computer instructions that may be executed by the processor 72. Additionally, the memory may store look-up tables and/or other relevant data. The ECU 25 monitors and controls the operation of the engine 10, for example, by adjusting ignition timing, timing of opening/closing valves 62 and 64, adjusting the delivery of fuel and oxidant (e.g., air), and so on.

In certain embodiments, other sensors may also be included in the system 8 and coupled to the ECU 25. For example, the sensors may include atmospheric and engine sensors, such as pressure sensors, temperature sensors, speed sensors, and so forth. For example, the sensors may include knock sensors, crankshaft sensors, oxygen or lambda sensors, engine air intake temperature sensors, engine air intake pressure sensors, jacket water temperature sensors, engine exhaust temperature sensors, engine exhaust pressure sensors, and exhaust gas composition sensors.

Other sensors may also include compressor inlet and outlet sensors for temperature and pressure.

Knock sensors and other sensors may provide useful data related to engine performance. In some cases, such data may be used to estimate a time corresponding to when a specific engine event occurred. In certain embodiments, such events may be short duration, high energy events (e.g., short term impulse events). Short duration, high energy events may be less than 100 milliseconds, and therefore, may be easily detectable in a signal received from the knock sensor 32 because such an event may result in a short, yet significant, change in the magnitude of the signal. It may be advantageous to determine when, and/or if, the intake valve 62 of the engine 10 closes to determine whether the timing of such an event correlates to optimal engine performance, for example. Additionally, it may be desirable to determine when a potentially detrimental engine event (e.g., loose or misaligned piston, valve, or connecting rod bolt) occurs such that those events may be predicted and prevented during future operation.

Figure 3:
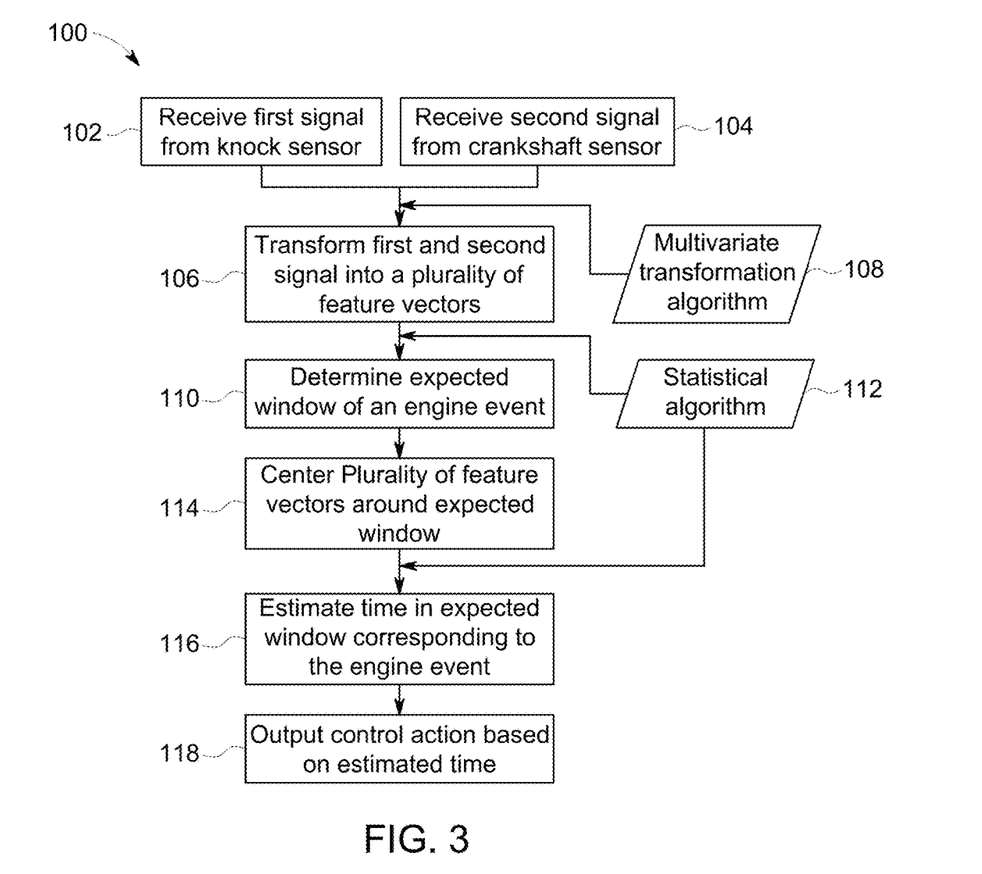
FIG. 3 illustrates a flow chart of a method for estimating a time corresponding to when an engine event occurred during normal operation of an engine, such as the engine of FIGS. 1 and 2, in accordance with aspects of the present disclosure.

FIG. 3 illustrates a block diagram 100 of an embodiment of the present disclosure related to estimating a time of an engine event during normal engine operation. In other words, block diagram 100 seeks to utilize inputs from sensors coupled to the engine 10 and determine when and/or if a specific engine (e.g., intake valve 62 closure) event has occurred while the engine operates normally (e.g., when powering a load).

At block 102, the ECU 25 (e.g., a controller or other computing device) receives a first signal from the knock sensor 23 relating to vibrations, acoustics, percussion, or the like in at least one cylinder 26 of the engine 10. The knock sensor signal itself will be described in more detail herein with reference to FIG. 5. At block 104, the ECU 25 (e.g., a controller) also receives a second signal from the crankshaft sensor 66 related to a position of the crankshaft 54. For example, the crankshaft sensor 66 may send a signal that includes an angle of the crankshaft 54 between 0° and 720°. Acquiring both the signal from the knock sensor 23 and the signal from the crankshaft sensor 66, may enable the ECU 25 to connect changes in vibrations, sounds, acoustics, or the like to a specific crankshaft angle (e.g., engine timing).

At block 106, the ECU 25 (e.g., a controller) may be programmed to transform the first signal from block 102 and the second signal from block 104 into a plurality of feature vectors. In certain embodiments, the transformation of block 106 may take place in two steps. In the first step, a multivariate transformation algorithm 108 stored in the memory unit 74 of the ECU 25 may be used to convert the signals from the knock sensor 23 and the crankshaft sensor 66 into a spectrogram (e.g., shown in FIG. 5). A spectrogram may refer to any representation of the knock sensor signal over time (e.g., crankshaft angle), for example. In certain embodiments, the multivariate transformation algorithm 108 is a short-time Fourier Transform ("STFT"). In other embodiments, the multivariate transformation algorithm 108 is another type of Fourier Transform, a Laplace Transform, a Mellin Transform, a Hartley Transform, a Chirplet Transform, a Hankel Transform, Mel-frequency cepstral coefficients ("MFCCs"), linear prediction coefficients ("LPC"), or any combination thereof. In still further embodiments, the original one-dimensional knock signal may not be transformed by the multivariate transformation algorithm 108, such that no spectrogram is generated. In the second step, the spectrogram may be converted into the plurality of feature vectors. In certain embodiments, the plurality of feature vectors may be determined from the spectrogram by taking the average frequency of the signal from the knock sensor 23 across rows of the spectrogram (e.g., over the range of engine time), for example. The plurality of feature vectors may have a uniform length ("D") that correlates to the number of qualities or characteristics that each feature vector represents. In certain embodiments, the features may include amplitude, a category (e.g., color illustrated on the spectrogram) related to an intensity of a frequency, or any other quality or characteristic included in the vector.

It should be noted that, in certain embodiments, the ECU 25 may not physically generate the spectrogram. Rather, the ECU 25 may directly convert the signal from the knock sensor 23 into the plurality of feature vectors. In other embodiments, the ECU 25 may encapsulate, or conceal, the functionality provided by the spectrogram in the processing steps performed by the processor 72 and/or stored in the memory unit 74, such that the spectrogram is never displayed or even obtainable by a user. Additionally, the spectrogram may refer to any data, data table, algorithm, graph, chart, or the like that is intended to categorically or qualitatively represent frequencies in a knock sensor signal over time.

In other embodiments, the transformation of the first and second signals into the feature vectors may take place in a single step (e.g., no spectrogram is generated). In still further embodiments, the aforementioned two steps transforming the first and second signals into the feature vectors may occur simultaneously.

At block 110, the ECU 25 may be configured to determine an expected timing window of the engine event to be detected. The expected timing window is determined by the ECU 25 based on a statistical algorithm 112. The statistical algorithm 112 may be a mathematical formula or algorithm trained to detect when and/or if a specific engine event for a particular engine type occurred. For example, the statistical algorithm 112 may utilize a statistical model that predicts the expected timing window of the specific engine event by associating various frequency patterns indicative of the specific engine event with a real-time knock sensor signal. Accordingly, the statistical algorithm 112 may utilize historical data, empirical data, knowledge-based data, or the like to determine the expected timing window. In other words, the statistical algorithm 112 may be able to estimate the expected timing window of the specific engine event by analyzing the first signal from the knock sensor 23 and locating various predictive frequency patterns that indicate that the specific engine event may occur. For example, the statistical algorithm 112 may be trained to detect a transition between a first engine condition and a second engine condition and correlate the transition to an occurrence of the specific engine event. This correlation may enable the statistical algorithm 112 to determine the expected timing window. In other embodiments, the statistical algorithm 112 may be trained to correlate a particular engine condition to the occurrence of the specific engine event, such that the expected timing window can be determined based on the particular engine condition.

In certain embodiments, the statistical algorithm 112 may be a Gaussian Mixture Model ("GMM"). In other embodiments, the statistical algorithm 112 may be another statistical mixture model, a Bayesian model, a graphical model, a machine learning model, a hidden Markov model, or any other model configured to associate known frequency patterns of a specific engine event (e.g., closure of the intake valve 62) with signals (e.g., knock sensor signals) received during normal engine operation. Forming the statistical algorithm 112 is described in more detail herein with respect to FIG. 4.

As used herein, the "specific engine event" relates to an incident occurring within the engine 10 that may be desirable to detect. For example, it may be desirable to detect an incident that occurs during normal engine operation (e.g., a valve closure) or an incident that may predict a potential engine failure. Accordingly, it may be desirable to detect when the intake valve 62 closes to determine whether the intake valve 62 is stuck, thereby allowing too much, or too little, oxidant 16 into the cylinder. Additionally, it may be desirable to detect when the exhaust valve 64 closes to determine whether the exhaust valve 64 is stuck, thereby trapping combustion gases in the cylinder 26 or preventing compression of the oxidant 16 and fuel 18 in the cylinder 26. It may also be desirable to detect a mechanical failure of the engine 10, such as loose or misadjusted engine components, the piston 20 contacting the cylinder 26, a broken exhaust valve 64 or intake valve 62, loose connecting rod 56 bolts, or the like. In certain embodiments, the statistical algorithm 112 may be trained to detect one specific engine event by learning from signals received by the ECU 25 known to contain the one specific engine event. In other embodiments, the statistical algorithm 112 may be trained to detect more than one specific engine events. For example, the statistical algorithm 112 may distinguish between an incident occurring during normal engine operation (e.g., valve closure) and an incident predicting a potential engine failure based on differing magnitudes included in the signals received by the ECU 25.

At block 114, the ECU 25 may center the plurality of feature vectors around the expected timing window determined at block 110. Centering the plurality of feature vectors around the expected timing window may involve characterizing each feature vector as corresponding to a particular state (e.g., either a first group or a second group) of the statistical algorithm 112. In certain embodiments, a first state (e.g., the first group) may be associated with a timing before the specific engine event occurs and a second state (e.g., the second group) may be associated with a timing after the specific engine event occurs. In other embodiments, the statistical algorithm 112 may include any number of states (e.g., 1, 3, 4, 5, 6, 7, 8, 9, 10, or more). However, the ECU 25 may not know the state to which a particular feature vector corresponds. In certain embodiments, the ECU 25 may center all of the feature vectors around the expected timing window. In other embodiments, the ECU 25 may center only a portion of the feature vectors from the signals around the expected window. For example, the ECU 25 may select only 2, 4, 6, 8, 10, 12, 14, 16, 18, 20, 22, 24, 26, 28, 30, 40, or 50 feature vectors to center about the expected timing window.

At block 116, the ECU 25 may estimate the time within the expected timing window at which the specific engine event occurred. Since the ECU 25 can classify the feature vectors as belonging to any number of engine states of the statistical model, the ECU 25 may search through a finite (although possibly very large) number of potential sequences of the feature vectors to determine which sequence, and thus which timing of the specific event, is most likely. For example, if six feature vectors are centered around the expected timing window, only seven sequences are possible since feature vectors belonging to the second state come after feature vectors belonging to the first state (e.g., FIG. 7). In certain embodiments, each sequence of feature vectors correspond to a potential timing of the specific engine event based on how many feature vectors belong to the first state and the second state, for example. The ECU 25 may use the statistical algorithm 112 to compute an individual likelihood for each sequence, and the sequence with the highest likelihood may correspond to the estimated time of the specific engine event.

At block 118, the ECU 25 may transmit a signal, or output, to an actuator or other device to take corrective action based on the estimated time of the specific engine event. For example, if the ECU 25 calculates an estimated time of the intake valve 62 closure that is later than expected, the ECU 25 may send a signal to adjust an ignition timing (e.g., the crankshaft angle at which a spark is introduced into the cylinder) of the engine 10. Furthermore, when the engine event may lead to engine failure (e.g., the intake valve 62 is damaged or broken) the ECU 25 may send a signal commanding the engine 10 to shutdown operation completely so that the intake valve 62 may replaced or repaired.

Figure 4:
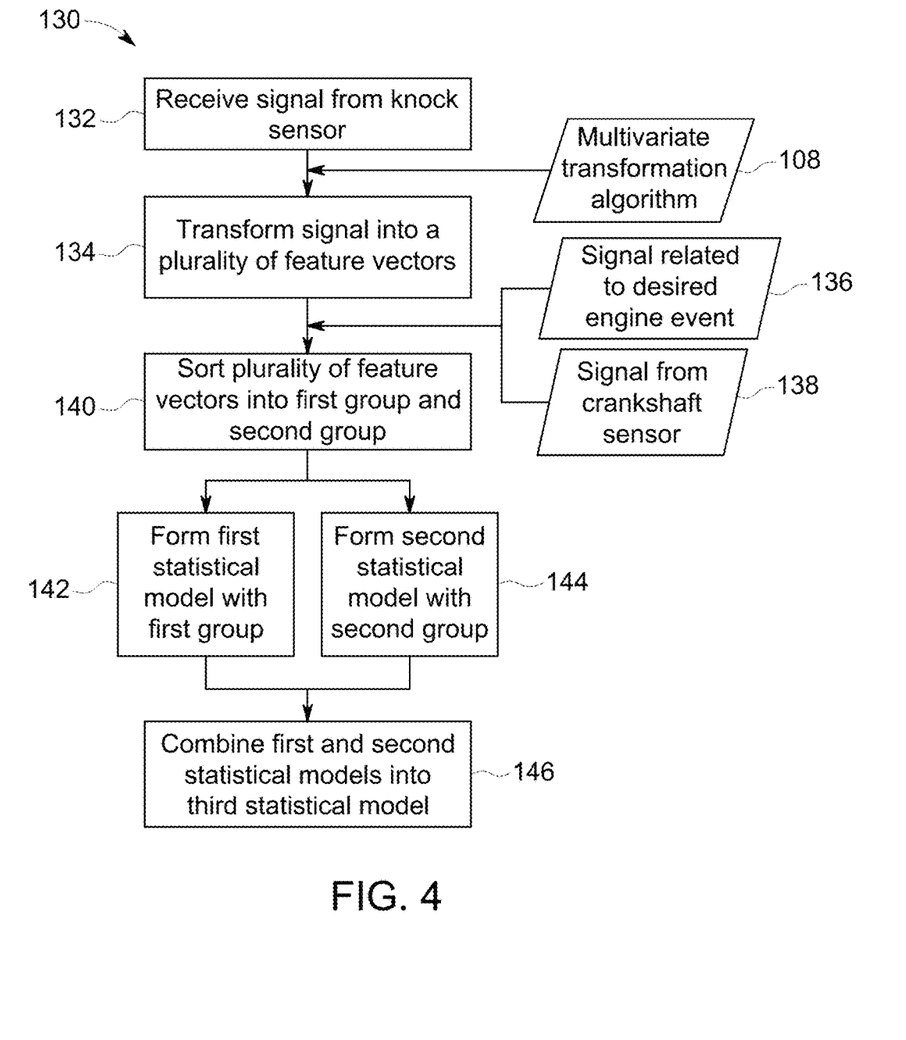
FIG. 4 illustrates a flow chart of a method for training a control unit to carry out a method for estimating a time corresponding to when an engine event occurred, such as the method of FIG. 3, by developing a statistical model, in accordance with aspects of the present disclosure.

FIG. 4 illustrates a block diagram 130 of an embodiment of the present disclosure related to forming the statistical algorithm 112 while the engine 10 is offline (e.g., not during normal engine operation). In certain embodiments, the block diagram 130 may be repeated until the timing error (e.g., a difference) between the time estimated by the statistical algorithm 112 and the true time of the specific engine event (e.g., detected via a sensor) reaches a certain value (e.g., below 0.5°). Moreover, the block diagram 130 may create a statistical algorithm 112 specific to a certain engine type. Thus, the block diagram 130 may be performed for each type of engine that may incur the specific engine event.

At block 132, the ECU 25, or other computing device (e.g., computer with statistical software), may receive a signal from the knock sensor 23. The signal transmitted by the knock sensor 23 contains frequency data related to the specific engine event (e.g., intake valve 62 closure). For example, if the specific engine event is closure of the intake valve 62, the signal received from the knock sensor 23 includes frequency data that is known to have been collected during closure of the intake valve 62. Similar to block diagram 100, at block 134 the signal received from the knock sensor 23 is transformed into a plurality of feature vectors. In certain embodiments, this transformation may occur in two steps. First, the signal from the knock sensor 23 may be converted to a spectrogram using the multivariate transformation algorithm 108. The transformation may be performed using the multivariate transformation algorithm 108 stored in the memory unit 74 of the ECU 25 or computing device. In certain embodiments, the multivariate transformation algorithm 108 is a short-time Fourier Transform ("STFT"). In other embodiments, the multivariate transformation algorithm 108 is another type of Fourier Transform, a Laplace Transform, a Mellin Transform, a Hartley Transform, a Chirplet Transform, a Hankel Transform, Mel-frequency cepstral coefficients ("MFCCs"), linear prediction coefficients ("LPC"), or any combination thereof. Second, the spectrogram may be transformed into a plurality of feature vectors. In still further embodiments, the original one-dimensional knock signal may not be transformed by the multivariate transformation algorithm 108, such that no spectrogram is generated. The plurality of feature vectors may have a uniform length ("D") that correlates to the number of qualities or characteristics that each feature vector represents. In certain embodiments, the features may include amplitude, color (e.g., color illustrated on the spectrogram), or any other quality or characteristic included in the vector. In other embodiments, the transformation of the signal from the knock sensor to the plurality of feature vectors may take place in a single step, or the first step and the second step may occur simultaneously.

The true time of the specific engine event contained in the knock sensor signal may be known by the ECU 25 or the computing device via a second signal 136 received from another sensor configured to detect the specific engine event (e.g., pressure sensor, valve angle sensor, etc.) and a third signal 138 corresponding to the crankshaft angle from the crankshaft sensor 66. These known inputs are utilized by the ECU 25, or the computing device, to sort the plurality of feature vectors into a first state and a second state at block 140. In certain embodiments, the first state includes feature vectors that correspond to a timing right before the specific engine event occurred and the second state includes feature vectors that correspond to a timing right after the specific engine event occurred. The ECU 25 or computing device utilizes signals 136 and 138 to determine the actual timing of the specific engine event, and then separates the plurality of feature vectors accordingly, so that the time right before the specific engine event can be characterized separate from the time right after the specific engine event.

At block 142, the ECU 25 or computing device is reprogrammed or configured (e.g., "trained") to associate the feature vectors in the first state to the time right before the specific engine event occurred. In other words, a first statistical model is formed using the feature vectors of the first state. The first statistical model may be capable of determining whether future feature vectors received during normal engine operation (e.g., such as those in block diagram 100) correspond to the time right before the specific engine event occurs by comparing the characteristics included in the feature vectors.

Similarly, at block 144, the ECU 25 or computing device is reprogrammed or configured (e.g., "trained") to associate the feature vectors in the second state to the time right after the specific engine event occurred. A second statistical model is created from the feature vectors of the second state. The second statistical model may be enabled to determine whether feature vectors received during normal engine operation (e.g., such as those in block diagram 100) correspond to the time right after the specific engine event occurs by comparing the characteristics included in the feature vectors.

At block 146, the ECU 25 or computing device combines the first statistical model with the second statistical model to form a third, overall statistical model (e.g., the statistical algorithm 112) that estimates the time of the specific engine event by associating received feature vectors (e.g., such as those in block diagram 100) with either a time right before or right after the specific engine event.

In certain embodiments, the third statistical model may compute the likelihood that each sequence of the finite possible sequences of feature vectors corresponds to the actual timing of the specific engine event. This process is described in more detail herein with respect to FIG. 7.

Figure 5:
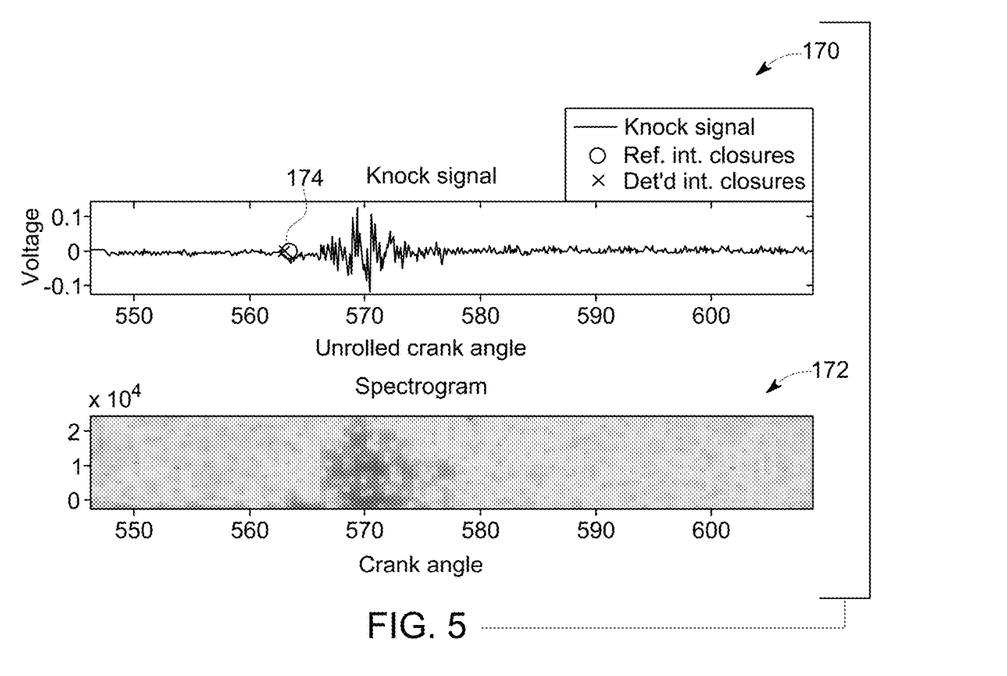
FIG. 5 illustrates an engine noise plot measured by a knock sensor and an embodiment of a spectrogram plot formed by applying a multivariate transformation algorithm to the engine noise plot, in accordance with aspects of the present disclosure.

FIG. 5 is an embodiment of an engine noise plot 170 (e.g., knock signal) measured by the knock sensor 23 and an embodiment of a spectrogram plot 172 generated after applying the multivariate transformation algorithm 108 to the engine noise plot 170. As shown in FIG. 5, the engine noise plot 170 (e.g., knock signal) includes a one-dimensional signal. In certain embodiments, the engine noise plot 170 measures knock sensor voltage over the engine timing (e.g., crankshaft angle). In other embodiments, the engine noise plot 170 may be a resistance or any other output that may correspond to a vibration, acceleration, or acoustics in the engine cylinder 26.

The engine noise plot 170 also shows the true timing 174 of the specific engine event being detected (e.g., intake valve 62 closure). As can be seen by FIG. 5, the signal of the engine noise plot 170 does not significantly change simultaneously with the occurrence of the engine event. Rather, the signal undergoes a significant jump in magnitude approximately 5° of the crankshaft after the engine event occurs. Therefore, a determination of the largest rate of change in magnitude of the signal will not necessarily provide an accurate estimate of the actual time of the specific engine event because of the delay in the knock sensor signal. The engine noise plot 170 also illustrates how the magnitude of the signal eventually levels out after the specific engine event occurs. Therefore, it is clear from the engine noise plot 170 that the specific engine event causes the knock signal to undergo a significant change in magnitude, but such change is only temporary (e.g., 100 milliseconds or less).

Also illustrated in FIG. 5 is an embodiment of the spectrogram plot 172 representative of the engine noise plot 170. A spectrogram may be a representation or data construct, visual or otherwise, of the frequencies included in the engine noise plot 170. For example, the spectrogram plot 172 may categorize different frequencies of the engine noise plot 170 in accordance with an intensity of the frequency (e.g., different shades on the spectrogram plot 172 refer to different intensities of a given frequency when visually represented). The spectrogram plot 172 may be generated by applying the multivariate transformation algorithm 108 to the engine noise plot 170. In certain embodiments, the multivariate transformation algorithm 108 is a short-time Fourier Transform ("STFT"). In other embodiments, the multivariate transformation algorithm 108 is another type of Fourier Transform, a Laplace Transform, a Mellin Transform, a Hartley Transform, a Chirplet Transform, a Hankel Transform, Mel-frequency cepstral coefficients ("MFCCs"), linear prediction coefficients ("LPC"), or any combination thereof. In still further embodiments, the original one-dimensional knock signal may not be transformed by the multivariate transformation algorithm 108, such that no spectrogram is generated. In order to estimate a time of the specific engine event, the spectrogram may be converted into a plurality of feature vectors. Feature vectors may provide valuable information regarding the frequency of the signal at any given time.

Again, it should be noted that, in certain embodiments, the ECU 25 may not physically generate the spectrogram plot 172. Rather, the ECU 25 may directly convert the signal from the knock sensor 23 into the feature vectors or may incorporate the functionality provided by the spectrogram into one or more transform functions or comparable mathematical constructs so as to streamline certain of the steps discussed herein. Additionally, the spectrogram plot 172 (or its data construct equivalent) should not be limited to the embodiment illustrated in FIG. 5. In other embodiments, the spectrogram plot 172 may be any data, data table, algorithm, graph, chart, or the like that is intended to represent frequencies, and the intensity of those frequencies, in a knock sensor signal over time. For example, the spectrogram plot 172 may categorize intensities of frequencies in a manner other than color (e.g., shapes, letters, numbers, shading, etc.).

Figure 6:
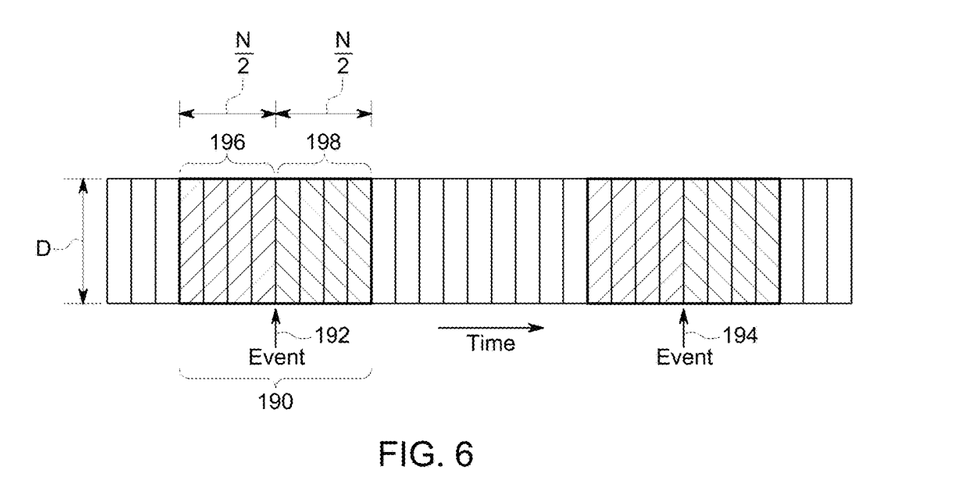
FIG. 6 illustrates a plurality of feature vectors determined from a spectrogram plot, such as the spectrogram plot of FIG. 5, where the feature vectors have been centered around engine events, in accordance with aspects of the present disclosure.

FIG. 6 illustrates an embodiment of a plurality of feature vectors 190 produced using the spectrogram plot 172. The feature vectors 190 have been centered around a first engine event 192 and a second engine event 194 in accordance with block 140 of block diagram 130. In certain embodiments, the first engine event 192 and the second engine event 194 are the same specific engine event. As illustrated in FIG. 6, the feature vectors 190 have been centered around the first engine event 192 such that there are an equal number of the feature vectors 190 before the first engine event 192 and after the first engine event 192. Thus, in the illustrated embodiment, the feature vectors 190 are sorted into a first state 196 corresponding to a time before the first engine event 192 and a second state 198 corresponding to a time after the first engine event 192. It should be noted that a similar process would be performed for the second engine event 194 as well. The time of the first engine event 192 and the time of the second engine event 194 may be known because the ECU 25 or other computing device may have received signals from other sensors providing such information. Once the plurality of feature vectors 190 have been sorted into the first state 196 and the second state 198, the ECU 25 or other computing device may begin to associate characteristics and qualities of the first state 196 such that a first statistical algorithm may be formed to predict when a feature vector is indicative of a time right before the specific engine event. Similarly, the ECU 25 or other computing device may associate characteristics and qualities of the second state 198 such that a second statistical algorithm may be formed to predict when a feature vector is indicative of a time right after the specific engine event. Finally, the ECU 25 or other computing device may then combine the first statistical algorithm and the second statistical algorithm into the statistical algorithm 112 that may be used to estimate a time of the specific engine event.

In certain embodiments, when the engine 10 is operating under normal conditions, the plurality of feature vectors 190 may be centered about an expected timing window, as described previously. During normal operation, the true time of the engine event is unknown, and thus, the feature vectors may not be sorted into two equal parts. The expected timing window of the first engine event 192 may be estimated by the ECU 25 or other computing device with the use of the statistical algorithm 112 created while the engine was running offline (e.g., not under normal operating conditions). For example, the statistical algorithm 112 may estimate the expected window based on historical data, empirical data, knowledge-based data, or the like. As discussed above, the statistical algorithm 112 may be trained to detect a transition between a first engine condition and a second engine condition and correlate the transition to an occurrence of the specific engine event. This correlation may enable the statistical algorithm 112 to determine the expected timing window. In other embodiments, the statistical algorithm 112 may be trained to correlate a particular engine condition to the occurrence of the specific engine event, such that the expected timing window can be determined based on the particular engine condition.

The ECU 25 or computing device then centers the feature vectors 190 around the expected timing window. The plurality of feature vectors 190 centered about the expected timing window may then be categorized into the first state 196 or the second state 198; however, it is unknown to which state 196, 198 the feature vector 190 actually corresponds. In certain embodiments, the feature vectors 190 centered about the expected timing window may all belong to the first state 196, all belong to the second state 198, or some may belong to the first state 196 and some to the second state 198. In other embodiments, more than two states of the statistical algorithm 112 may be included. In any event, a finite number of possible sequences of the feature vectors 190 may be formed because each feature vector may only belong to one state (e.g., either the first state 196 or only the second state 198). Moreover, a feature vector belonging to the second state 198 cannot be followed by a feature vector belonging to the first state 196 because the feature vectors 190 belonging to the first state 196 come earlier in time.

Figure 7:
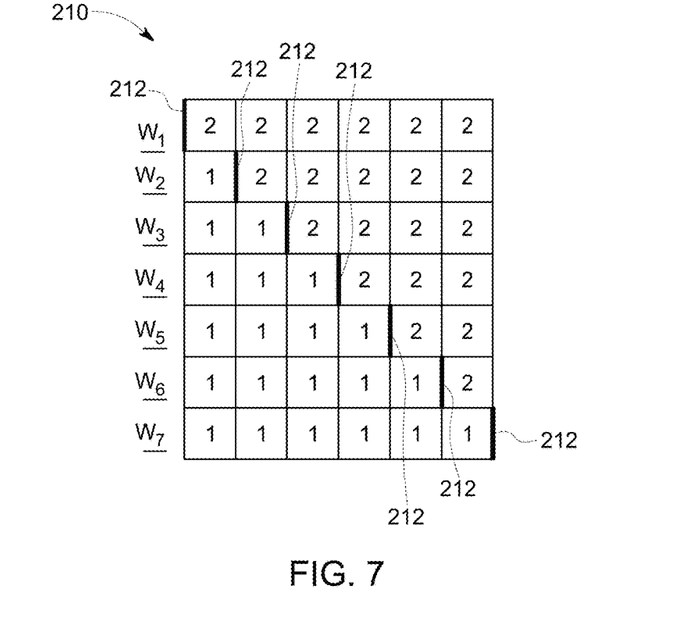
FIG. 7 illustrates possible sequences of feature vectors centered around an expected timing window of an engine event, in accordance with aspects of the present disclosure.

FIG. 7 illustrates an embodiment 210 of the possible sequences of feature vectors centered around an expected timing window of a specific engine event when there are a total of six feature vectors. It should be noted that while FIG. 7 illustrates the seven possible sequences when six feature vectors are used by the statistical algorithm 112, any number of feature vectors may be used. For example, the statistical algorithm 112 may utilize 1, 2, 3, 4, 5, 6, 7, 8, 9, 10, 12, 14, 16, 18, 20, 25, 30, 35, 40, 45, 50, or more feature vectors. The number of feature vectors may be represented by "N." Regardless of how many feature vectors are utilized by the statistical algorithm, the number of possible sequences of feature vectors may be N+1.

As mentioned previously, FIG. 7 illustrates how, in certain embodiments, a feature vector belonging to the second state 198 (e.g., those boxes with a "2") of the statistical algorithm 112 cannot be followed by a feature vector belonging to the first state 196 (e.g., boxes with a "1"). Again, this attribute of the possible sequences occurs because feature vectors belonging to the second state 198 may come later in time than those feature vectors belonging to the first state 196, and something occurring earlier in time cannot come after something occurring later in time. As shown in the illustrated embodiment, the point 212, where the sequence switches from the first state 196 to the second state 198 may correspond to the estimated timing of the specific engine event. Therefore, each sequence represents a different time of the specific engine event. In other embodiments, the timing of the specific engine event may be determined by the statistical algorithm 112 by correlating a particular engine state to the specific engine event or any other suitable means.

After determining all possible sequences of the feature vectors, the ECU 25 or computing device computes a likelihood (e.g., a probability) that each sequence most closely represents the true time of the specific engine event using the statistical algorithm 112. The sequence that has the highest likelihood is then chosen as the final estimate of the time that the specific engine event occurred.

Figure 8:
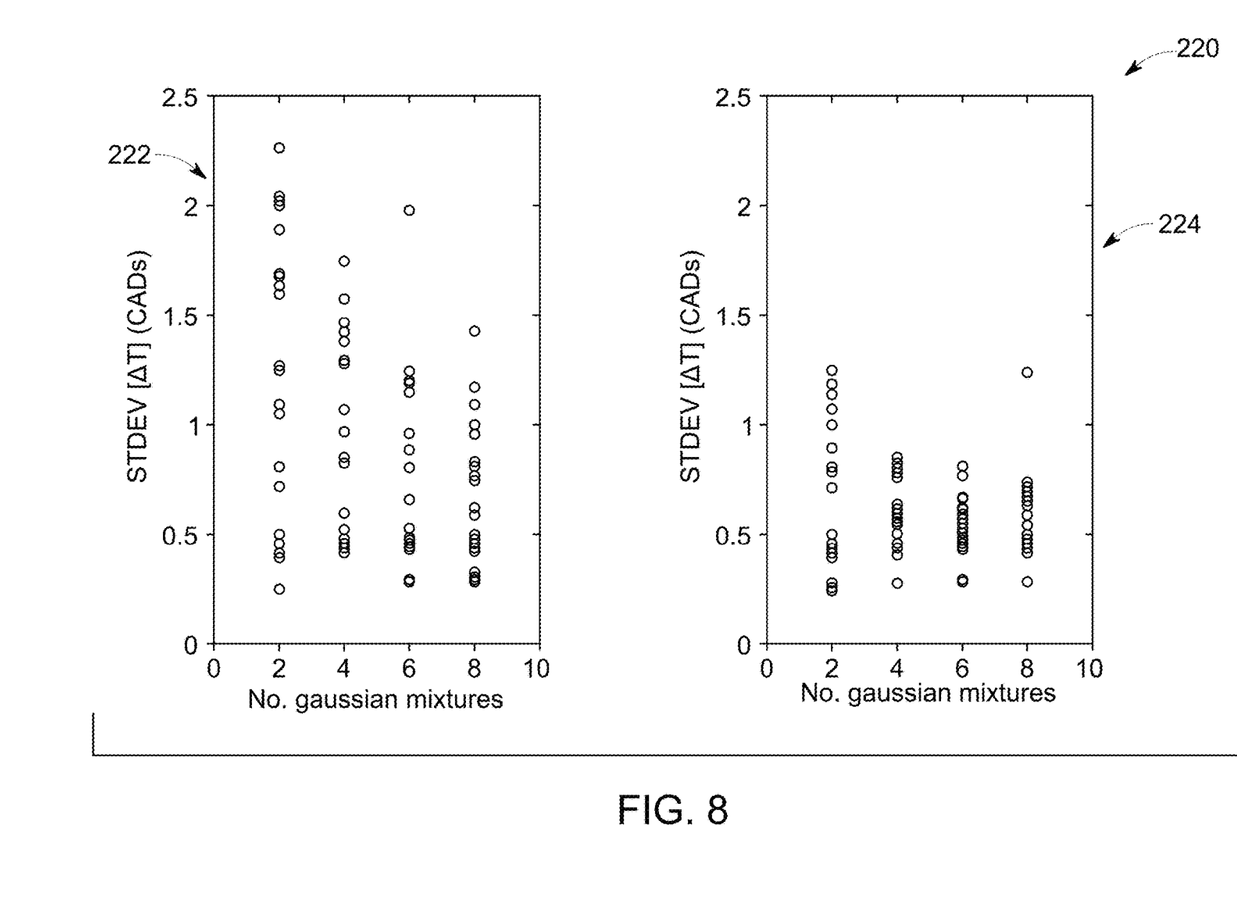
FIG. 8 illustrates a graphical representation of standard deviations for different statistical algorithms developed, in accordance with aspects of the present disclosure.

FIG. 8 illustrates a graphical representation 220 of standard deviation values produced when different statistical algorithms were used to predict a time of the specific engine event. The graphs shown in FIG. 8 are meant to be representative of what can be achieved by the disclosed embodiments, and therefore, they are not meant to limit the presently disclosed embodiments to only such results. FIG. 8 shows two graphs. The first graph 222 shows standard deviation values for Gaussian Mixture Models (e.g., the statistical algorithm 112) that utilized 15 feature vectors for the first state 196 and 15 feature vectors for the second state 198 (30 feature vectors total). The first graph 222 also shows standard deviation values for Gaussian Mixture Models using different numbers of Gaussian mixtures. The number of Gaussian mixtures may be an input parameter into the model that can be varied to optimize accuracy. In certain embodiments, the number of Gaussian mixtures may be 2, 3, 4, 5, 6, 7, 8, 9, 10, 11, 12, 15, 20, 25, 30, 35, 40, 45, 50, or more. The first graph 222 shows that, of the data displayed, choosing 8 Gaussian mixtures minimized the standard deviation for a Gaussian Mixture Model that utilizes 30 feature vectors.

Additionally, FIG. 8 illustrates a second graph 224 that includes standard deviation values produced with Gaussian Mixture Models using 8 feature vectors in the first state 196 and 8 feature vectors in the second state 198 (16 total feature vectors). Graph 224 shows that, of the data from the statistical models using 16 total feature vectors, the model that included 6 Gaussian mixtures resulted in the lowest standard deviation.

Figure 9:
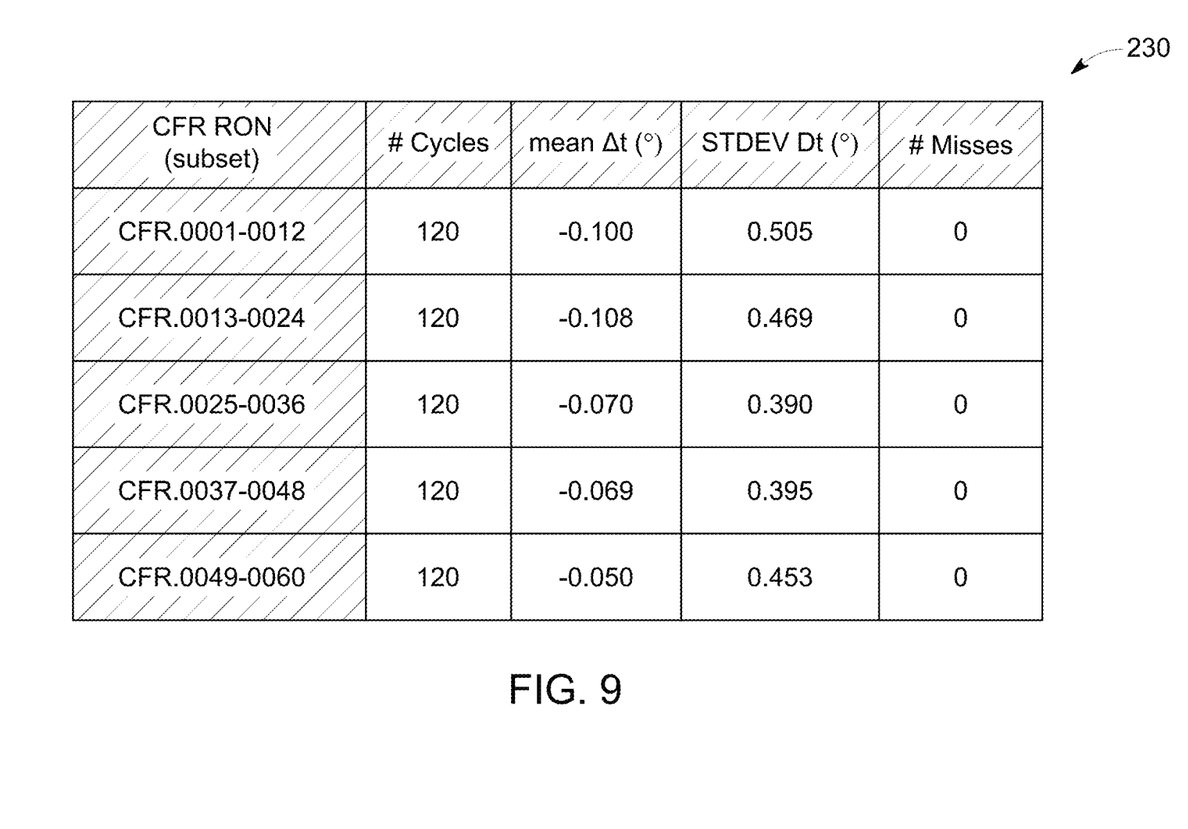
FIG. 9 illustrates a table of values related to a comparison between an estimated time of an engine event and a true time of the engine event using statistical algorithms, in accordance with aspects of the present disclosure.

Similarly, FIG. 9 illustrates a table 230 that includes values comparing an estimated time of a specific engine event using the statistical algorithm 112 and a true time of the specific engine event. Again, FIG. 9 is meant to be representative of what can be achieved by the disclosed embodiments, and therefore, it is not meant to limit the presently disclosed embodiments to only such results. FIG. 9 shows that the statistical algorithm 112 can potentially predict the time of the specific engine event within 0.1° of the crankshaft. In certain embodiments, the statistical algorithm 112 may estimate a time of the specific engine event within 0 and 30°; 0 and 25°; 0.05 and 15°; or anywhere therebetween. Additionally, FIG. 9 illustrates that the statistical algorithm 112 may predict whether the specific engine event occurs with relatively high precision. FIG. 9 shows that the statistical algorithm 112 can be employed within the engine 10 during normal operation and accurately estimate the time of the specific engine event.

Technical effects of the invention include receiving a signal from a knock sensor related to an engine event. The signal may be used to estimate a time of the specific engine event using a statistical algorithm developed while the engine was operated offline. Parameters of the engine may be adjusted based on the time estimate to improve fuel efficiency, enhance power output, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for estimating when an engine event occurs, comprising:
at least one knock sensor coupled to a combustion engine;
at least one engine crankshaft sensor coupled to the combustion engine;
an engine control unit configured to:
receive a first signal from the at least one knock sensor;
receive a second signal from the at least one engine crankshaft sensor;
transform the first signal from the at least one knock sensor into a plurality of feature vectors using a multivariate transformation algorithm by converting the first signal into a spectrogram and transforming the spectrogram into the plurality of feature vectors;
sort, using the second signal from the at least one engine crankshaft sensor, the plurality of feature vectors into a first state and a second state, wherein the first state corresponds to a time before the engine event and the second state corresponds to a time after the engine event; and
form a first statistical model using the first state;
form a second statistical model using the second state;
combine the first statistical model and the second statistical model into a third statistical model;
determine, using the third statistical model, an expected timing window of the engine event;
center a segment of the plurality of feature vectors around the expected timing window by associating a frequency pattern indicative of the engine event with the first signal from the at least one knock sensor;
estimate, using the third statistical model, an estimated time in the expected timing window corresponding to the engine event; and
sending a signal to take corrective action based on the estimated time of the engine event.

2. The system of claim 1, wherein the engine event lasts 100 milliseconds ("ms") or less.

3. The system of claim 1, wherein the engine event is a valve closure.

4. The system of claim 1, wherein the engine event is a mechanical failure of the combustion engine.

5. The system of claim 1, wherein the third statistical model is a Gaussian Mixture Model.

6. The system of claim 1, wherein the third statistical model is a machine learning algorithm.

7. The system of claim 1, wherein the multivariate transformation algorithm is a short time Fourier Transform.

8. The system of claim 1, wherein the third statistical model estimates the time of the engine event by determining a sequence of feature vectors that comprises a maximum likelihood of the engine event occurring.

9. The system of claim 1, wherein the third statistical model is trained offline to estimate the time in the expected window corresponding to when the engine event occurred.

10. The system of claim 1, wherein the estimate of the time in the expected window corresponding to when the engine event occurs is within 30 degrees of the true event.

11. A method for training a controller to estimate the timing of an engine event, comprising:
receiving a signal from at least one knock sensor, wherein the signal comprises data corresponding to an engine event;
transforming the signal into a plurality of feature vectors using a multivariate transformation algorithm;
sorting the plurality of feature vectors into a first state and a second state, wherein the first state corresponds to a time before the engine event and the second state corresponds to a time after the engine event; and
forming a first statistical model using the first state;
forming a second statistical model using the second state;
combining the first statistical model and the second statistical model into a third statistical model, wherein the third statistical model is configured to predict when the engine event occurs during normal engine operation.

12. The method of claim 11, wherein the signal is a one-dimensional, frequency signal.

13. The method of claim 11, wherein the first statistical model is a first Gaussian Mixture Model and the second statistical model is second Gaussian Mixture Model.

14. The method of claim 13, wherein the number of Gaussian mixtures of the first Gaussian Mixture Model and the second Gaussian Mixture Model is between 0 and 10.

15. The method of claim 13, wherein the first state and the second state comprise between 1 and 20 feature vectors.

16. A method for estimating a time of an engine event, comprising:
receiving a first signal from at least one knock sensor coupled to a combustion engine;
receiving a second signal from at least one engine crankshaft sensor coupled to the combustion engine;

transforming the first signal from the at least one knock sensor into a plurality of feature vectors;

sorting, using the second signal from the at least one engine crankshaft sensor, the plurality of feature vectors into a first state and a second state, wherein the first state corresponds to a time fore the engine event and the second state corresponds to a time after the engine event; and forming a first statistical algorithm using the first state;

forming a second statistical algorithm using the second state;

combining the first statistical algorithm and the second statistical algorithm into a third statistical algorithm, wherein the third statistical algorithm is configured to predict when the engine event occurs during normal engine operation;

determining, using the third statistical algorithm, an expected window of an engine event;

centering, using the third statistical algorithm, a segment of the plurality of feature vectors around the expected window of the engine event by associating a frequency pattern indicative of the engine event with the first signal from the at least one knock sensor;

estimating, using the third statistical algorithm, a time of the engine event; and outputting a control action for at least the combustion engine based on the time of the engine event.

17. The method of claim 16, wherein the engine event is a valve closure.

18. The method of claim 16, wherein the engine event is a mechanical failure of the combustion engine.

19. The method of claim 16, wherein the statistical algorithm is a Gaussian Mixture Model.

20. The method of claim 16, wherein the control action comprises shutting down the combustion engine.

* * * * *